US009074890B2

(12) United States Patent
Günthner et al.

(10) Patent No.: US 9,074,890 B2
(45) Date of Patent: *Jul. 7, 2015

(54) DOUBLE-AXLE, SHOCK-RESISTANT ROTATION RATE SENSOR WITH LINEAR AND ROTARY SEISMIC ELEMENTS

(75) Inventors: Stefan Günthner, Frankfurt (DE); Bernhard Schmid, Friedberg (DE)

(73) Assignee: Continental Teves AG & Co oHG (DE)

( * ) Notice: Subject to any disclaimer, the term of this patent is extended or adjusted under 35 U.S.C. 154(b) by 571 days.

This patent is subject to a terminal disclaimer.

(21) Appl. No.: 13/390,776

(22) PCT Filed: Sep. 9, 2010

(86) PCT No.: PCT/EP2010/063248
§ 371 (c)(1),
(2), (4) Date: May 2, 2012

(87) PCT Pub. No.: WO2011/029878
PCT Pub. Date: Mar. 17, 2011

(65) Prior Publication Data
US 2012/0210788 A1 Aug. 23, 2012

(30) Foreign Application Priority Data

Sep. 9, 2009  (DE) .................. 10 2009 029 310
Sep. 9, 2009  (DE) .................. 10 2009 029 311

(51) Int. Cl.
*G01C 19/56* (2012.01)
*G01C 19/574* (2012.01)
(Continued)

(52) U.S. Cl.
CPC .......... *G01C 19/574* (2013.01); *G01C 19/5642* (2013.01); *G01C 19/5719* (2013.01)

(58) Field of Classification Search
CPC ............... G01C 19/5719; G01C 19/56; G01C 19/5607; G01C 19/5649; G01C 19/5642; G01C 19/5663; G01C 19/5635
USPC ................ 73/501.12, 504.14, 504.02, 504.04
See application file for complete search history.

(56) References Cited

U.S. PATENT DOCUMENTS 5,604,312 A   2/1997  Lutz
6,122,962 A   9/2000  Yoshino
(Continued)

FOREIGN PATENT DOCUMENTS

CN    101443629    5/2009
DE    4428405      2/1996
(Continued)

OTHER PUBLICATIONS

International Search Report corresponding to International Application No. PCT/EP2010/063248, dated Nov. 26, 2010.
(Continued)

*Primary Examiner* — Helen Kwok
(74) *Attorney, Agent, or Firm* — RatnerPrestia

(57) ABSTRACT

A micromechanical rotation rate sensor has at least one first and one second seismic mass coupled to at least one first drive device and are suspended such that the first and second seismic masses are driven such that they are deflected in antiphase in one drive mode, with the rotation rate sensor being designed such that it can detect rotation rates about at least two mutually essentially orthogonal sensitive axes, wherein at least the first and second seismic masses are designed and suspended such that they oscillate in antiphase in a first read mode when a first rotation rate about the first sensitive axis is detected, and the first and second seismic masses and/or additional seismic masses are designed and suspended such that they oscillate in antiphase in a second read mode when a second rotation rate about the second sensitive axis is detected.

16 Claims, 8 Drawing Sheets

(51) Int. Cl.
G01C 19/5642 (2012.01)
G01C 19/5719 (2012.01)

(56) References Cited

U.S. PATENT DOCUMENTS

| | | | |
|---|---|---|---|
| 6,349,597 B1 | 2/2002 | Folkmer | |
| 6,691,571 B2 | 2/2004 | Willig | |
| 6,742,390 B2* | 6/2004 | Mochida et al. | 73/504.14 |
| 6,837,107 B2* | 1/2005 | Geen | 73/504.04 |
| 6,892,575 B2 | 5/2005 | Masiri et al. | |
| 7,134,337 B2 | 11/2006 | Willig | |
| 7,284,429 B2* | 10/2007 | Chaumet et al. | 73/504.12 |
| 7,421,897 B2* | 9/2008 | Geen et al. | 73/504.12 |
| 7,461,552 B2* | 12/2008 | Acar | 73/504.04 |
| 7,950,281 B2* | 5/2011 | Hammerschmidt | 73/504.04 |
| 8,256,290 B2* | 9/2012 | Mao | 73/504.12 |
| 8,261,614 B2* | 9/2012 | Hartmann et al. | 73/504.12 |
| 8,322,213 B2* | 12/2012 | Trusov et al. | 73/504.12 |
| 8,342,023 B2* | 1/2013 | Geiger | 73/504.12 |
| 8,443,668 B2* | 5/2013 | Ohms et al. | 73/504.12 |
| 8,459,110 B2* | 6/2013 | Cazzaniga et al. | 73/504.12 |
| 8,794,067 B2 | 8/2014 | Schmid | |
| 2003/0131664 A1 | 7/2003 | Mochida et al. | |
| 2004/0154398 A1 | 8/2004 | Willig | |
| 2005/0066728 A1 | 3/2005 | Chojnacki | |
| 2006/0107738 A1 | 5/2006 | Willig | |
| 2006/0112764 A1 | 6/2006 | Higuchi | |
| 2010/0037690 A1 | 2/2010 | Günthner et al. | |
| 2010/0116050 A1 | 5/2010 | Wolfram | |
| 2012/0279301 A1* | 11/2012 | Gunthner et al. | 73/504.12 |

FOREIGN PATENT DOCUMENTS

| | | |
|---|---|---|
| DE | 103 00 682 | 7/2003 |
| DE | 10 2005 051 048 | 6/2006 |
| DE | 10 2007 012 163 | 10/2007 |
| DE | 10 2006 052 522 | 5/2008 |
| DE | 102007030119 | 1/2009 |
| DE | 10 2007 054 505 | 5/2009 |
| EP | 1 832 841 | 9/2007 |
| EP | 1 918 723 | 5/2008 |
| JP | 2007-108044 | 4/2007 |
| WO | WO 98/17973 | 4/1998 |
| WO | WO 2004/097432 | 11/2004 |
| WO | WO 2006/070059 | 7/2006 |
| WO | WO 2006/113162 | 10/2006 |
| WO | 2007104742 | 9/2007 |
| WO | 2008015044 | 2/2008 |
| WO | WO 2008/021534 | 2/2008 |
| WO | WO 2008/051677 | 5/2008 |

OTHER PUBLICATIONS

German Search Report corresponding to German Application No. 10 2010 040 514.0 dated Jun. 3, 2011.
Chinese Office Action for Chinese Application No. 2010800396831 mailed Oct. 29, 2014.
German Search Report corresponding to German Application No. 10 2010 040 516.7, dated Jun. 3, 2011.
International Search Report for PCT International Application No. PCT/ EP2010/063250, dated Dec. 6, 2010.
Entire patent prosecution history of U.S. Appl. No. 13/391,314, filed May 4, 2012, entitled, "Double-Axial, Shock-Resistant Rotation Rate Sensor With Nested, Linearly Oscillating Seismic Elements."

* cited by examiner

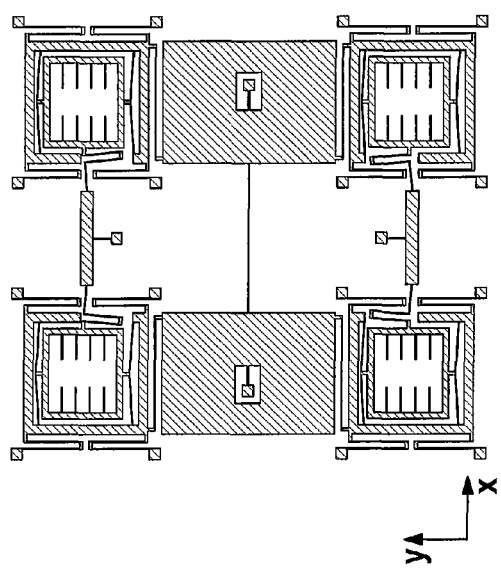
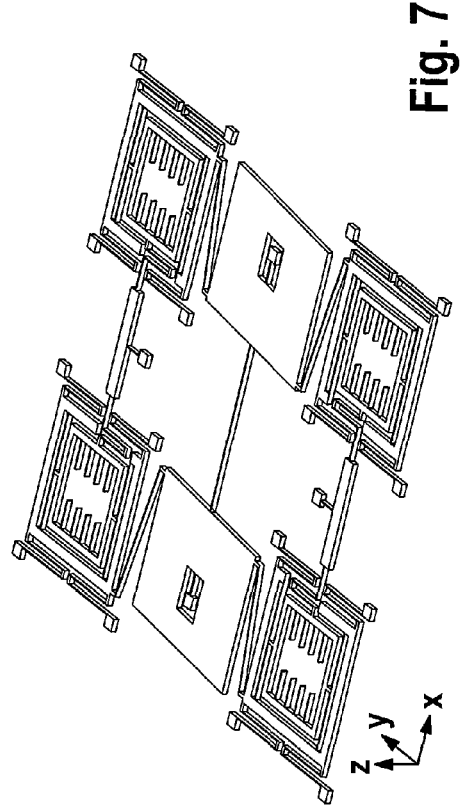
Fig. 7
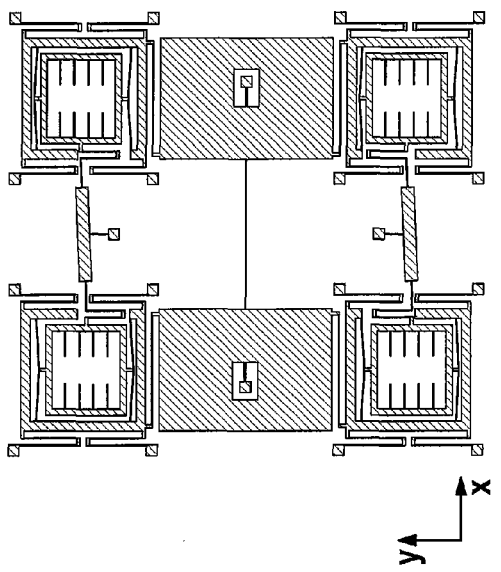
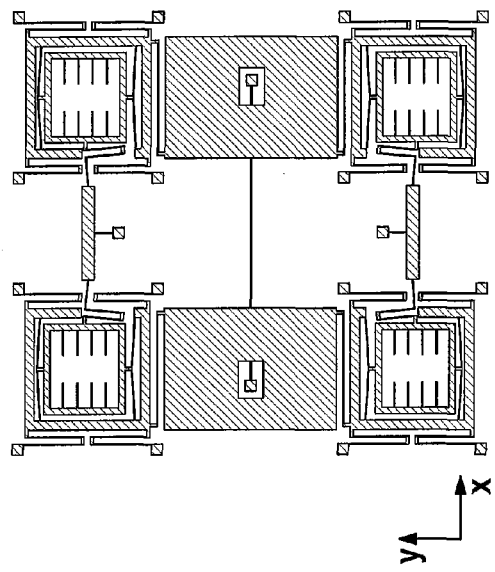

DOUBLE-AXLE, SHOCK-RESISTANT ROTATION RATE SENSOR WITH LINEAR AND ROTARY SEISMIC ELEMENTS

CROSS REFERENCE TO RELATED APPLICATIONS

This application is the U.S. National Phase Application of PCT International Application No. PCT/EP2010/063248, filed Sep. 9, 2010, which claims priority to German Patent Application No. DE 10 2009 029 310.8, filed Sep. 9, 2009, and German Patent Application No. DE 10 2009 029 311.6, filed Sep. 9, 2009, the contents of such applications being incorporated by reference herein.

FIELD OF THE INVENTION

The invention relates to a micromechanical rotation rate sensor comprising a substrate whose base surface is aligned parallel to the x-y plane of a Cartesian coordinate system (x, y, z), with the rotation rate sensor having at least one first and one second seismic mass which are coupled to at least one first drive device and are suspended such that the first and the second seismic masses are driven such that they are deflected in antiphase in one drive mode, with the rotation rate sensor being designed such that it can detect rotation rates about at least two mutually essentially orthogonal sensitive axes (z, y).

BACKGROUND OF THE INVENTION

Document WO 2006070059 A1, which is incorporated by reference, describes a rotation rate sensor for measurement of rotary movements about the y axis. This consists of two seismic masses which oscillate about the z axis (at right angles to the substrate plane) in antiphase about their center of gravity, during the drive mode. In the case of a rotation rate about the y axis, both masses oscillate about the x axis in antiphase about their center of gravity—read mode. This arrangement is relatively resistant to external disturbances, because the overall center of gravity of the arrangement remains at rest during the drive mode, and the sensor is therefore insensitive to design influences. Furthermore, by virtue of their arrangement, both modes—drive mode and read mode—cannot, or can scarcely, be excited directly by external linear excitations or by external rotational excitations.

Document WO 2006113162 A1, which is incorporated by reference, describes a rotation rate sensor for measurement of rotor movements about the z axis. This consists of four seismic masses which oscillate in the x direction during the primary movement or drive mode, such that respectively directly adjacent masses move in antiphase. In the case of a rotation rate about the z axis, the four seismic masses oscillate in the y direction such that respectively directly adjacent masses move in antiphase. This arrangement is also quite resistant to external disturbances, since the overall center of gravity of the arrangement remains at rest during the primary movement, and the sensor is therefore insensitive to design influences. Furthermore, by virtue of their arrangement, both modes—drive mode and read mode—cannot be excited directly by external linear excitations or by external rotational excitations.

The documents WO 2004097432 A1, WO 2008021534 A1, DE 102006052522, DE 102005051048, U.S. Pat. No. 6,892,575, EP 1832841 and WO 2008051677, which are all incorporated by reference, describe sensors which can simultaneously measure rotary movements about the x axis and about the y axis—that is to say no rotary movements at right angles to the base surface of the substrate which, according to the example, is parallel to the x and y axes. The sensor principles mentioned are single-chip solutions; that is to say the sensor elements for measurement of the orthogonal rotation rates are located on the same monolithic silicon chip. Furthermore, they have the common feature that only a single primary movement is excited for both sensitive axes. This saves control-system complexity; furthermore, the chip area is smaller than in the case of two separate sensors. In the case of a Coriolis force, a rotary movement about the x or y axis excites oscillations with movement components in the z direction. If it is intended to use these sensors to measure rotation speeds about the z axis, the sensors must be installed by means of a construction and connection technique, that is to say they must be mounted at 90° with respect to the planar preferred direction—the wafer plane. This leads to additional costs.

The document EP 1918723, which is incorporated by reference, proposes a gyroscope which can simultaneously measure rotary movements about the x and z axes. This is also a single-chip solution with a single primary mode or drive mode. However, this sensor has the disadvantage that both read modes—also referred to as the secondary (detection of the rotation about the z axis) and tertiary (detection of the rotation about the x axis) modes—can be excited directly by rotational movements, and this leads to the sensor being sensitive to disturbances caused by environmental influences.

Document WO 9817973 A1, which is incorporated by reference, proposes a three-axis gyroscope. In this case, in the drive mode, four masses which are each offset through 90° oscillate in the radial direction. This arrangement can distinguish between Coriolis forces in all three spatial directions. However, the individual masses are not directly connected to one another, as a result of which the individual masses are deflected away from the substrate plane, for example in the event of linear accelerations at right angles to the substrate plane.

SUMMARY OF THE INVENTION

Aspects of the invention propose a micromechanical rotation rate sensor which can detect rotation rates about at least two sensitive axes and is at the same designed to be relatively resistant to disturbances.

According to aspects of the invention, this is achieved by the micromechanical rotation rate sensor as comprising a substrate whose base surface is aligned parallel to the x-y plane of a Cartesian coordinate system (x, y, z), with the rotation rate sensor having at least one first and one second seismic mass which are coupled to at least one first drive device and are suspended such that the first and the second seismic masses are driven such that they are deflected in antiphase in one drive mode, with the rotation rate sensor being designed such that it can detect rotation rates about at least two mutually essentially orthogonal sensitive axes (z, y), wherein at least the first and the second seismic masses are designed and suspended such that they oscillate in antiphase in a first read mode when a first rotation rate about the first sensitive axis (y) is detected, and the first and second seismic masses and/or additional seismic masses are designed and suspended such that they oscillate in antiphase in a second read mode when a second rotation rate about the second sensitive axis (z) is detected, with the seismic masses being associated with read devices which are designed and arranged with respect to the seismic masses such that they detect the deflections of the seismic masses with respect to the first and with respect to the second read mode in each case in phase and in antiphase.

The invention described here and the rotation rate sensor according to aspects of the invention disclose in particular a method which is better than the prior art for measurement of rotation speeds by means of a duplicated-differential read principle.

The invention is based in a preferred manner on the idea of proposing a rotation rate sensor which comprises a substrate whose base surface is aligned parallel to the x-y plane of a Cartesian coordinate system. In this case, the rotation rate sensor has at least one first and one second seismic mass, which are coupled to at least one first drive device and are suspended such that the first and the second seismic masses are driven such that they are deflected in antiphase in one drive mode, with the rotation rate sensor being designed such that it can detect rotation rates about at least two mutually essentially orthogonal sensitive axes. In addition, at least the first and the second seismic masses are designed and suspended such that they oscillate or are deflected in antiphase in a first read mode when a first rotation rate about the first sensitive axis is detected, and the first and second seismic masses and/or additional seismic masses are designed and suspended such that they oscillate or are deflected in antiphase in a second read mode when a second rotation rate about the second sensitive axis is detected, with the seismic masses being associated with read devices which are designed and arranged with respect to the seismic masses such that they detect the deflections of the seismic masses with respect to the first and with respect to the second read mode in each case in phase and in antiphase. In this case, phase and antiphase preferably correspond to the antiphase nature of the deflections or oscillation of the first and second seismic masses and/or additional seismic masses It is preferred that at least the first and the second seismic masses are each associated with two read devices.

In a preferred manner, the term antiphase also means in opposite senses and in the same direction, linearly or on a curved path, with mutually inverse orientation, in particular in pairs with respect in each case to one pair of seismic masses, particularly preferably the first and second seismic masses, and in each case one pair of the additional seismic masses.

A linear deflection or oscillation preferably means a translational deflection or oscillation.

The phase and the antiphase are expediently each detected separately, in particular by respective separate read devices.

It is preferable for the first and second seismic masses to be coupled by means of at least one coupling spring, with the coupling spring being designed such that these seismic masses are rotationally deflected only in antiphase, and in-phase rotational deflection is suppressed, in particular with the first and second seismic masses additionally being suspended on in each case at least one anchor and being suspended on the substrate such that linear deflections of these seismic masses in any direction are essentially suppressed.

The at least one drive device and/or the at least one read device are/is preferably in the form of capacitive comb structures or plate structures, with the drive device being excited electrostatically, and with the read device detecting electrostatically.

The rotation rate sensor is preferably formed monolithically or on a single chip or integrally, thus allowing both sensitive axes to be aligned considerably more accurately with respect to one another than in the case of the split between two chips for sensing rotation rates about different axes, since the alignment of the axes is defined by the micromechanical production, which is several orders of magnitude more precise than the conventional construction and connection technique by means of which two separate sensors can be aligned with respect to one another. Furthermore, the handling of a single-chip sensor element, which can detect rotary movements about two sensitive axes, is also simpler than the handling of two separate sensor elements.

The rotation rate sensor preferably has a single drive device which drives all the seismic masses of the rotation rate sensor, for which purpose the seismic masses are appropriately suspended and are coupled directly or indirectly to this drive device. This results in the control-system complexity being less than that of two separate sensors with two separate drive units, since the drive oscillation or drive mode (also referred to as the primary oscillation) must be maintained throughout the entire operating time, and a phase-locked loop as well as closed-loop amplitude control are often required for this purpose. A single drive device allows significant savings in ASIC area and current draw or power consumption, and therefore more cost-effective signal processing. Furthermore, the joint use of a single drive unit allows space to be saved, as a result of which more sensors can be located on a silicon wafer, and the sensors can thus be produced more cost-effectively.

Preferably, the rotation rate sensor is designed and the seismic masses are arranged such that the center of gravity of the entire rotation rate sensor remains essentially at rest with respect to the deflections of the seismic masses in the drive mode.

The rotation rate sensor is preferably designed such that the first sensitive axis lies on the x-y plane, that is to say in the base surface of the substrate, in particular in that the first sensitive axis is parallel to the x axis or to the y axis, and in that the second sensitive axis is parallel to the z axis, that is to say at right angles to the base surface of the substrate.

It is preferred that all the seismic masses of the rotation rate sensor are designed, suspended and coupled such that they are suspended such that they can move exclusively for their respective deflections within the drive mode, for their respective deflections within the first read mode, with this relating only to the seismic masses which oscillate in the first read mode when a rotation rate about the first sensitive axis is detected, and for their respective deflections within the second read mode, with this relating only to the seismic masses which oscillate in the second read mode when a rotation rate about the second sensitive axis is detected, and in that these deflections take place in antiphase for the seismic masses which oscillate in the respective mode, with the seismic masses being suspended stiffly with respect to all other deflections.

Preferably, the first and the second seismic masses are suspended and driven such that they oscillate in antiphase in a rotational drive mode, in particular in a rotational drive mode about the z axis.

Expediently, the rotation rate sensor has additional seismic masses, in particular four additional seismic masses, which are arranged and suspended symmetrically in a rest position with respect to the center of gravity of the entire rotation rate sensor.

Preferably, the first and second seismic masses are suspended and/or coupled such that they can exclusively carry out antiphase, rotational deflections about the z axis and about the x axis, and the additional seismic masses are particularly preferably suspended and/or coupled such that they can exclusively carry out linear deflections in the direction of the x axis and in the direction of the y axis.

It is expedient that each of the additional seismic masses is at least partially suspended on a respectively associated frame, in particular in each case in the inner area of the frame, which is in each case coupled to the first or to the second seismic mass, by which means, in particular, the drive energy for the drive mode is transmitted from the first and the second seismic masses via the respectively coupling spring elements to the frames and to the additional seismic masses which are at least partially suspended thereon. In this case the frame can be open or closed.

Preferably, the frames are suspended such that they can exclusively carry out linear deflections in the direction of the x axis.

Expediently, one pair of the additional seismic masses is in each case coupled by means of a coupling beam such that they can carry out only antiphase deflections with respect to the second read mode, in particular in the y direction.

If the capability to carry out deflections or oscillations is or becomes restrictive, for example by "exclusively" or "only", it is expedient for no other movements to be possible. For example, if only linear deflections in the y direction are possible, all rotational deflection forms are impossible, as well as all deflections in the x or z direction.

A seismic element preferably means a seismic mass.

It is expedient that, with respect to the drive mode and for the transmission of the drive energy, the deflection and phase angle of the frames and of the additional seismic masses correspond to the deflection component in the x direction of the free ends of the first or second seismic mass at the coupling springs or at coupling spring elements, in each case between the first or second seismic mass and the respective frame.

It is expedient that the deflection of the seismic masses which oscillate in one of the read modes is detected in a duplicated and differential manner, with in each case two opposing deflections being detected with respect to the antiphase deflection for phase and for antiphase, that is to say the seismic masses which oscillate in one of the read modes are associated overall with at least four read devices. These four read devices are in this case, in particular, evaluated in a duplicated and differential manner.

The invention also relates to a method for production of the micromechanical rotation rate sensor.

The invention also relates to the use of the rotation rate sensor in motor vehicles, in particular for detection of the yaw rate, that is to say rotation about the vertical axis of the vehicle, and for detection of a roll rate or a pitch rate. In addition or alternatively, this arrangement is preferably used for the simultaneous measurement of yaw rate and roll rate, yaw rate and pitch rate, or roll rate and pitch rate in vehicles. This information is used for detection and monitoring of movement-dynamic situations in ESP, occupant protection and comfort control systems. Sensors which are used in this field must provide high accuracy for the rotation rate measurement and a signal-to-noise ratio which is as low as possible. A further requirement for these sensors is good resistance to external disturbances, such as mechanical vibration and shocks. The sensor proposed here is preferably designed such that it can comply with all of these requirements, but in particular vibration resistance.

BRIEF DESCRIPTION OF THE DRAWINGS

The invention is best understood from the following detailed description when read in connection with the accompanying drawings. Included in the drawings is the following figures:

FIG. 7 shows examples of parasitic modes in a rotation rate sensor such as this.

DETAILED DESCRIPTION OF THE PREFERRED EMBODIMENTS

Figure 1:
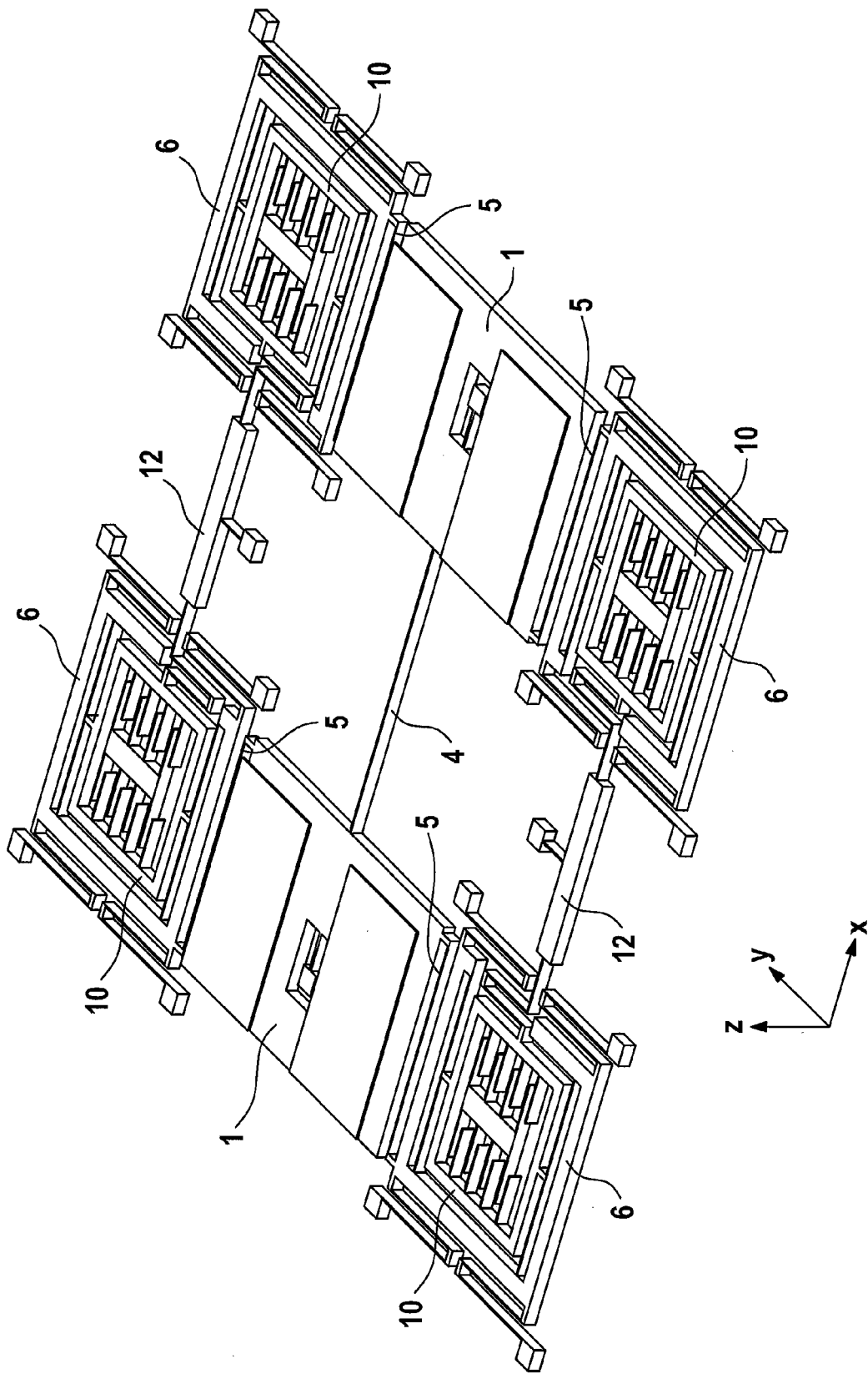
FIG. 1 shows a perspective illustration of a dual-axial rotation rate sensor.
Figure 2:
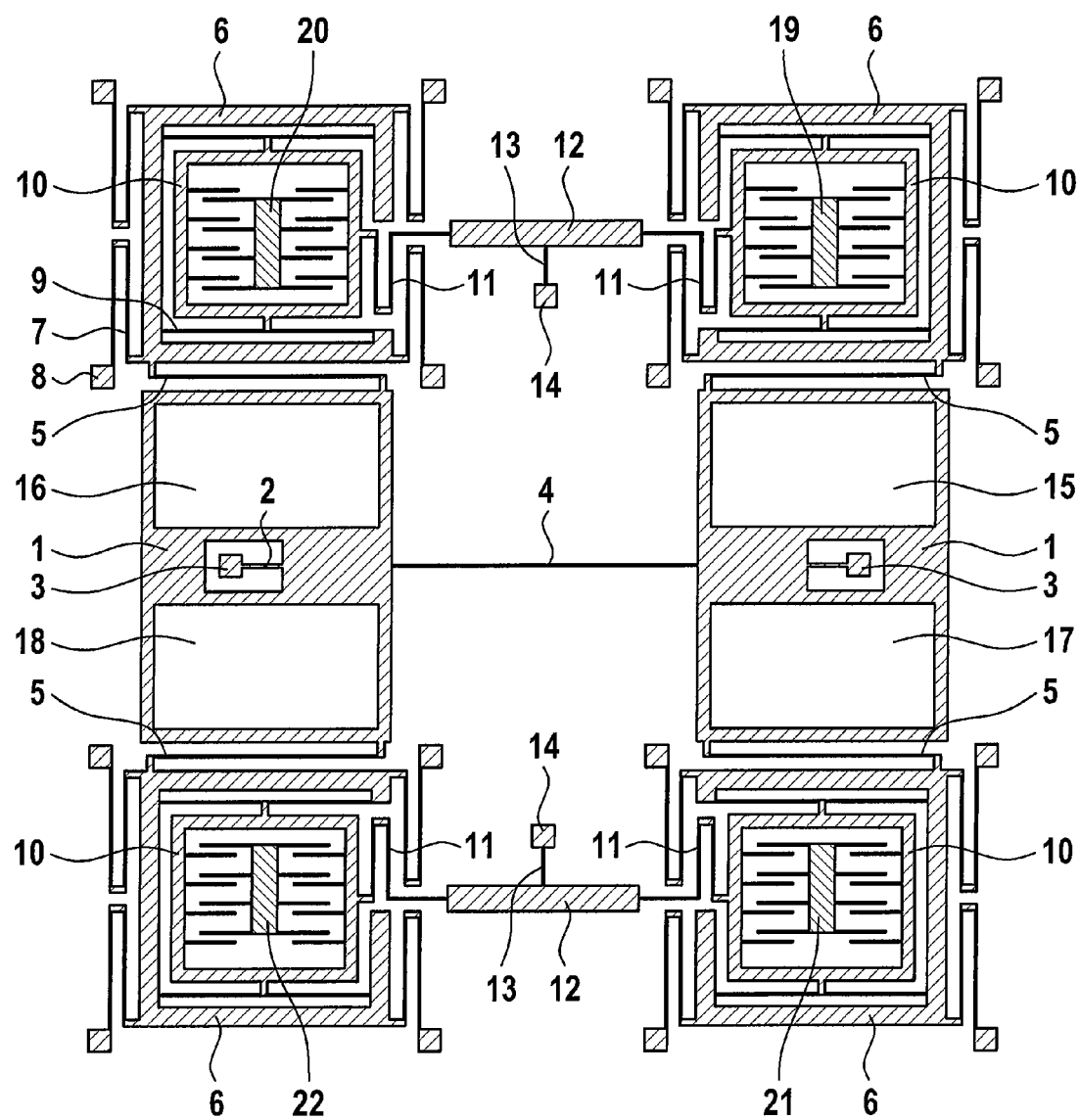
FIG. 2 shows a plan view of a dual-axial rotation rate sensor.
Figure 3:
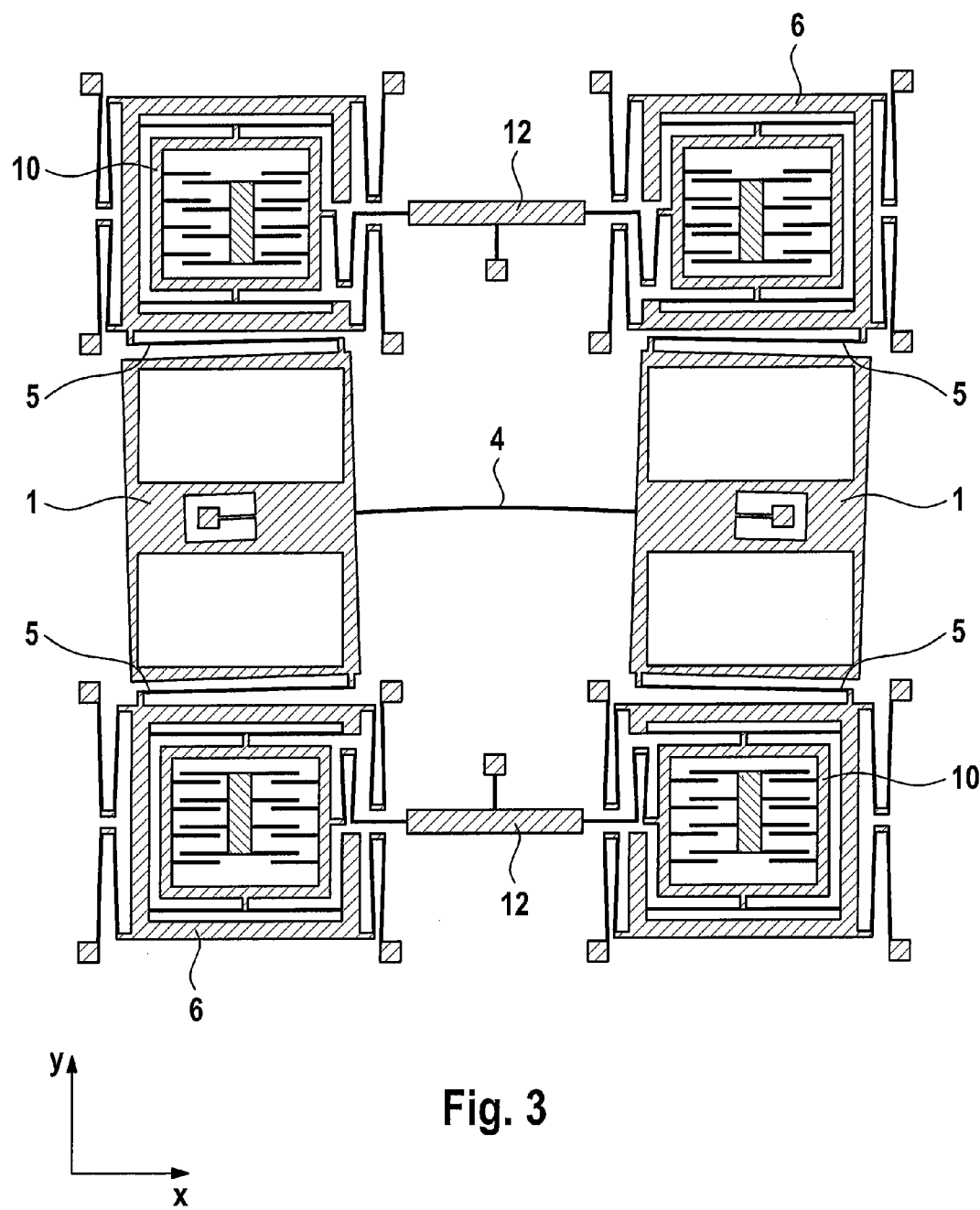
FIG. 3 shows the primary mode or drive mode of a rotation rate sensor such as this with read units.
Figure 4:
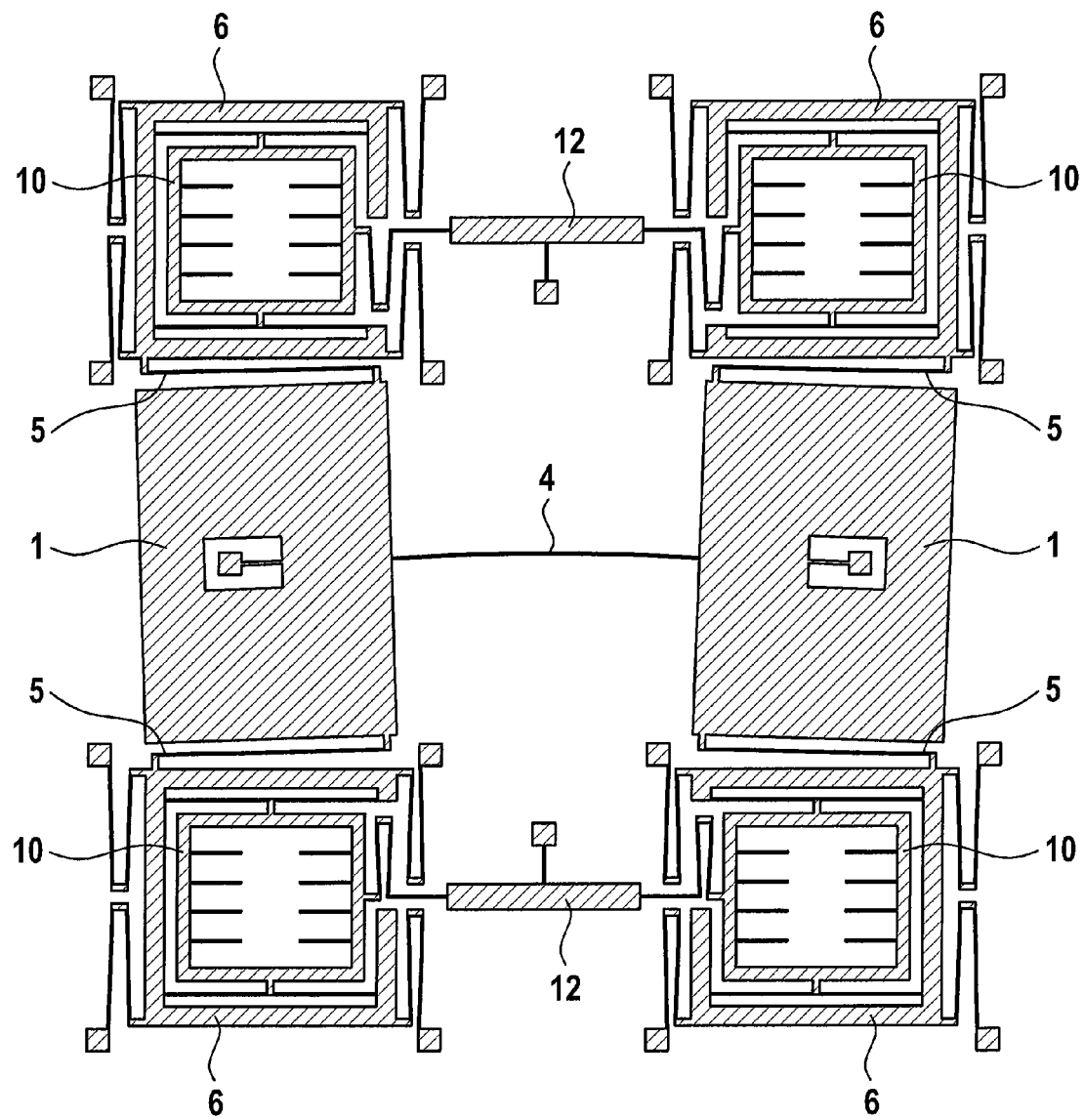
FIG. 4 shows the primary mode or drive mode of a rotation rate sensor such as this without read units.
Figure 6:
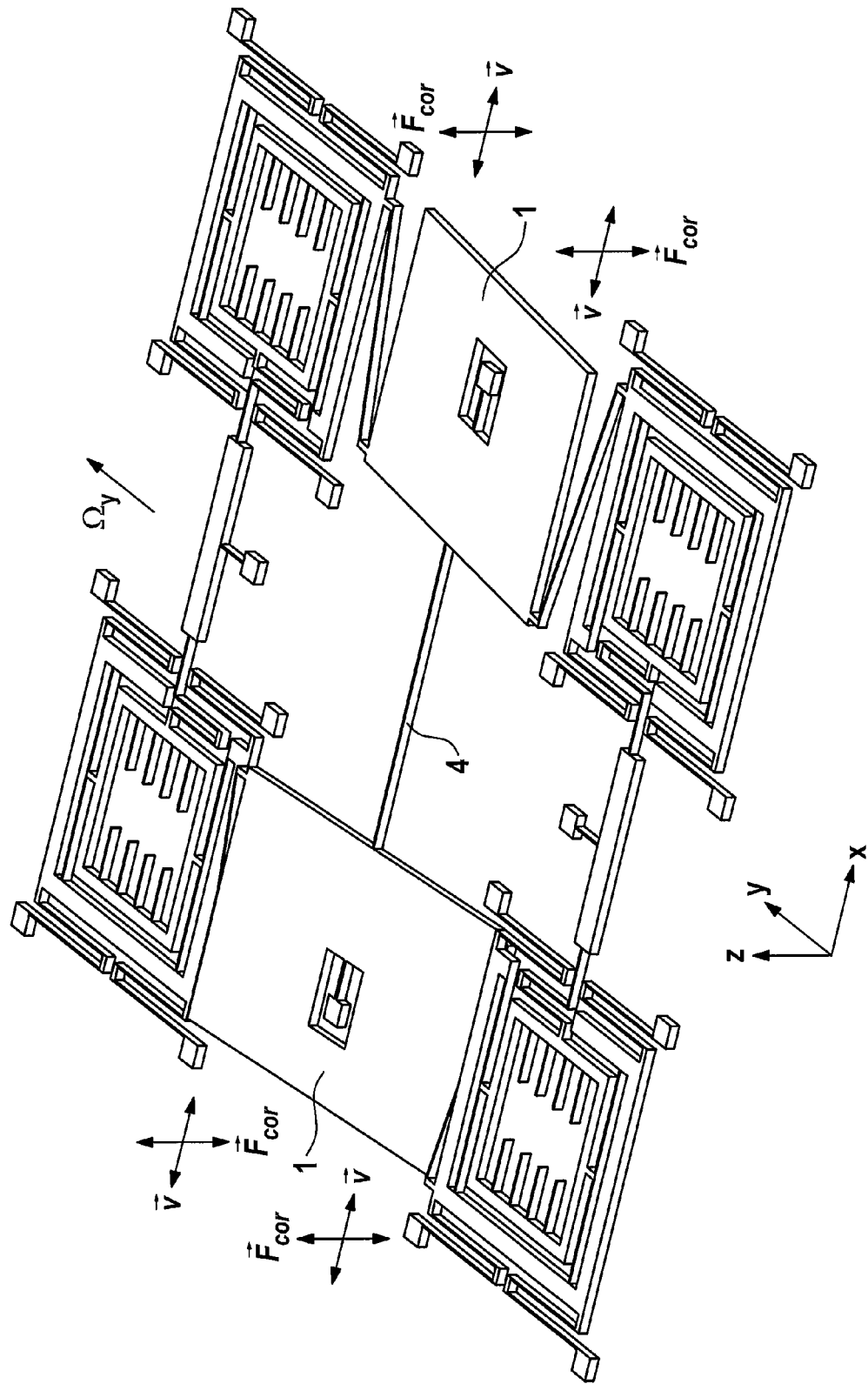
FIG. 6 shows the tertiary mode or first read mode of this rotation rate sensor on detection of a first rotation rate about the first sensitive axis.

FIG. 1 and FIG. 2 show an example of a rotation rate sensor which can detect both rotational speeds about the z axis, as the second sensitive axis, and about the y axis, as the first sensitive axis. The sensor consists of two masses 1, as the first and second seismic masses which are connected to anchors 3 and to one another via spring elements 2, 4 such that they can carry out rotational movements about the z axis, with the first and second seismic masses 1 moving in antiphase during the course of the drive mode, drive oscillation or primary mode, see FIG. 3 and FIG. 4. The suspension of the first and second seismic masses 1 furthermore allows rotational movements about the x axis, with the coupling spring 4 also providing coupling between the two masses 1 in this oscillation. There is therefore a mode, as the first read mode, in which seismic masses 1 oscillate in antiphase, or in the opposite direction, about the y axis, see FIG. 6. Apart from mutually antiphase rotations about the x and z axes, the seismic masses 1, as the first and second seismic masses, cannot carry out any movement.

Frames 6 are attached to the seismic masses 1 via coupling spring elements 5 such that the frames 6 can move freely in the y direction independently of the masses 1, however such that the deflection of the frames 6 in the x direction corresponds to the deflection of the free ends of the seismic masses 1 at the coupling point of the spring elements 5. The frames 6 are in turn connected to anchors 8 via spring elements 7 such that, primarily, they can be moved only in the x direction. Deflections along other degrees of freedom are suppressed. The coupling spring elements 5 ensure that the rotational movement of seismic masses 1 is converted to a linear movement of the frames 6.

Two frames 6 are connected via the coupling spring elements 5 to each of the two seismic masses 1, such that the frames 6 move with the same deflection in antiphase in the x direction, as the drive mode for additional seismic masses 10. It is impossible for these frames 6 to move in phase in the x direction.

The additional seismic masses 10 are connected via spring elements 9 to the frames 6 such that the deflection of the free ends of the first and second seismic masses 1 in the x direction is transmitted one-to-one via the frames 6. Also, the additional seismic masses 10 additionally have a degree of freedom in the y direction, made possible by the springs 9. Two of the four additional seismic masses 10 are each connected via spring elements 11, 13 and coupling beams 12 to one another or to anchors 14 such that they can move only in antiphase in the y direction with the same deflection. The coupling beams 12 are in this case connected via the spring element 13 to the anchor 14 such that, primarily, it is only possible for the coupling beam 12 to rotate about the z axis. The spring elements 11 allow a linear movement of the additional seismic masses 10 with a simultaneous rotational movement of the coupling beams 12, and transmit the deflection of the free end of the coupling beams in the y direction to the additional seismic masses 10.

Figure 5:
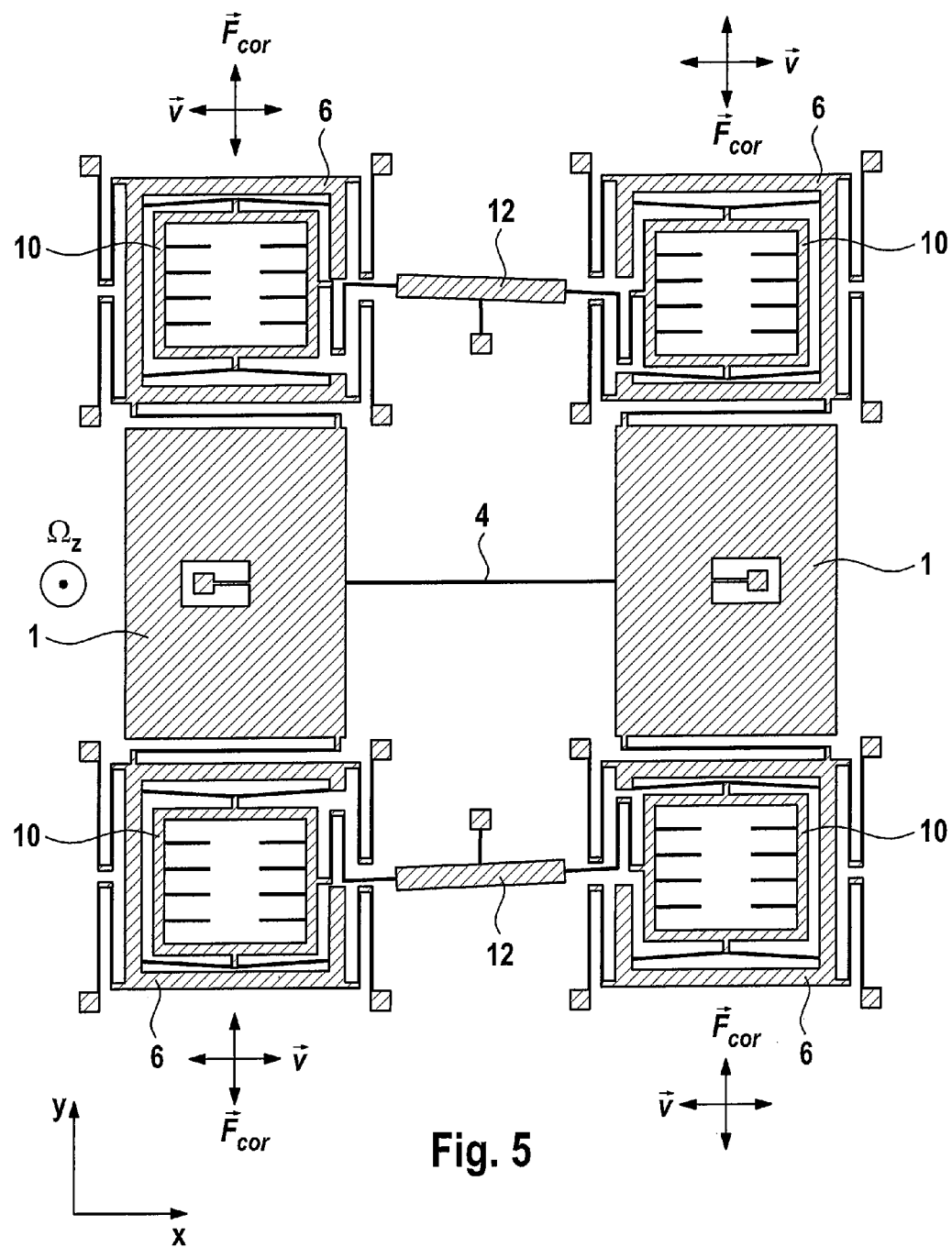
FIG. 5 shows the secondary mode or second read mode of this rotation rate sensor on detection of a second rotation rate about the second sensitive axis.

According to the example, the rotation rate sensor has a total of three natural modes: the primary or drive mode, the secondary or second read mode and the tertiary mode or first read mode. In order to measure rotation speeds, the sensor must first of all be operated in the primary mode or drive mode, FIG. 4. This is characterized in that the first and second seismic masses 1 rotate in antiphase with respect to one another about the z axis; at the same time, the frames 6 move together with the additional seismic masses 10 linearly, in the x direction, with the linear deflection and phase angle of the frames 6 and masses 10 corresponding to the x component of the deflection of the free ends of the masses 1 at the location of the coupling spring elements 5. The center of gravity of the entire arrangement remains at rest during the primary movement. By way of example, the primary mode can be driven via electrostatic excitation with the aid of capacitive comb structures. In the case of rotation of the sensor about the z axis, as the second sensitive axis, apparent forces act on the moving masses. In this case, Coriolis forces with identical amplitudes but different phase angles act on the additional seismic masses 10, that is to say an antiphase deflection takes place. The phase relationships are derived from the phase angle of the speed of the additional seismic masses 10 during the primary movement; the Coriolis forces therefore cause the secondary mode to be excited, see FIG. 5. The Coriolis force resulting from a rotation $\vec{\Omega}$ of a mass point m with respect to an inertial system which is moving at a velocity $\vec{v}$ with respect to the moving coordinate system is: $\vec{F}_{cor}=2m\vec{v}\times\vec{\Omega}$.

When the sensor rotates about the y axis, apparent forces act on the moving masses. In this case, Coriolis forces act on the first and second seismic masses 1 such that the tertiary mode, as the first read mode, is excited, see FIG. 6.

The deflections of the secondary mode, as the second read mode, and tertiary oscillation, as the first read mode, in the case of a Coriolis force are proportional inter alia to the rotation speed $\Omega_z$, or $\Omega_y$, producing them. By way of example, the deflections can be detected by capacitive elements, which convert the mechanical deflection to a capacitive signal. The read devices 19, 20, 21 and 22 detect deflections of the additional seismic masses 10 in the y direction and are connected such that the difference between the sum of the capacitance changes of the read devices 19 and 20 and the sum of the capacitance changes of the read devices 21 and 22 is used as an output signal. This type of duplicated-differential reading detects only the secondary mode, or second read mode, and is insensitive to other natural modes in which the additional seismic masses 10 are moved in the direction of the y axis, see FIG. 7 top left and right and bottom left. Other arrangements of the comb structures and adapted signal evaluation are also possible. The read devices 15, 16, 17 and 18 detect deflections of the first and second seismic masses 1 in the z direction and are connected such that the difference between the sum of the capacitance changes of the read devices 15 and 18 and the sum of the capacitance changes of the read devices 16 and 17 is used as an output signal. This type of duplicated-differential read detects only the tertiary mode or first read mode, and is insensitive to in-phase rotations of the seismic masses 1 about the x axis, see FIG. 7 bottom right.

Figure 8:
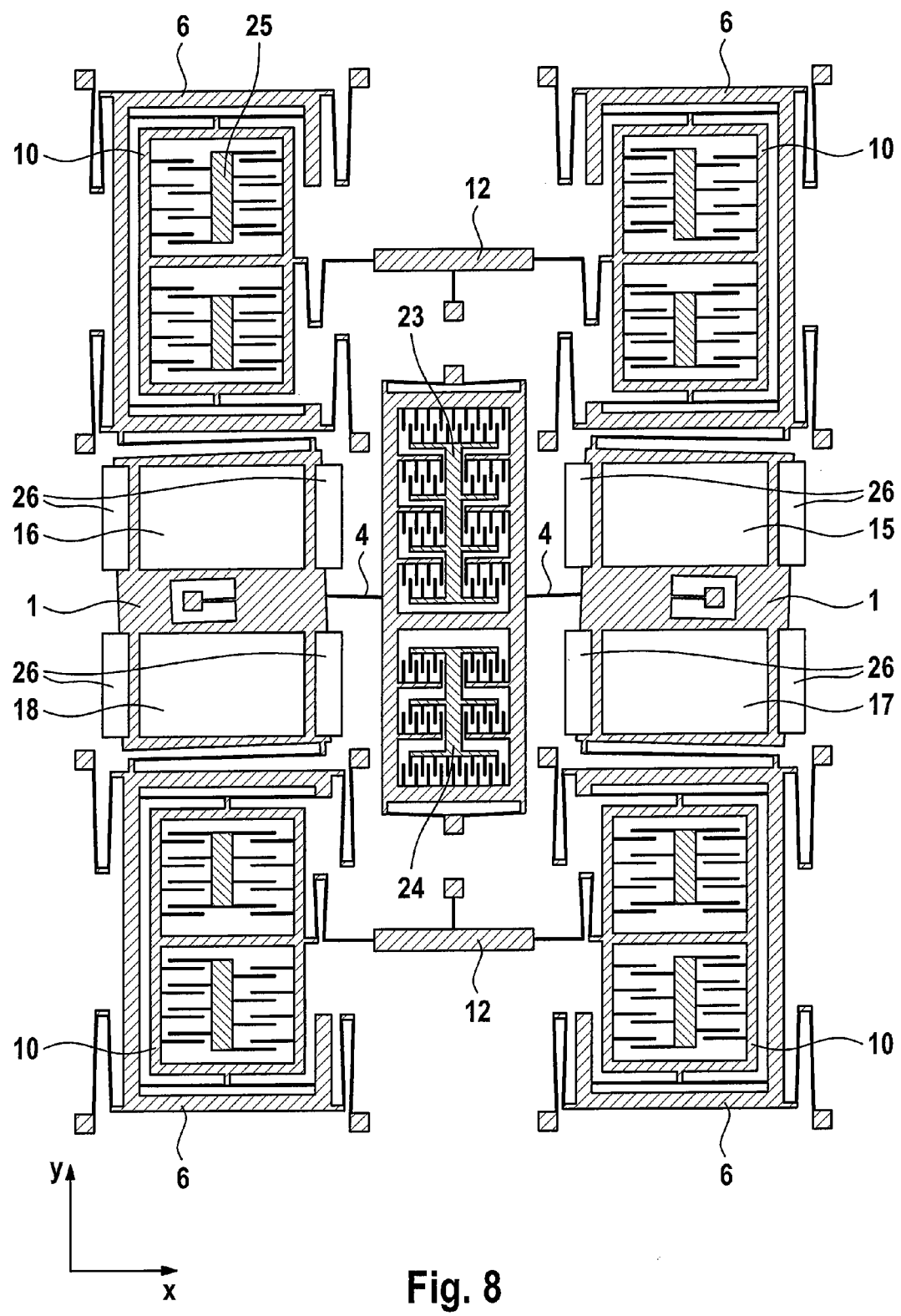
FIG. 8 shows one exemplary embodiment of the rotation rate sensor with drive, drive monitoring and trim structures.

FIG. 8 shows one exemplary embodiment of the rotation rate sensor with additional devices. This has only one drive device 23, which is not illustrated in FIGS. 1 to 7. As shown, drive device 23 acts on the connection, in this case coupling spring 4, between the rotationally suspended first and second seismic masses 1 or—not illustrated—alternatively on the seismic masses 1 themselves or, likewise not illustrated, on the linearly oscillating frames 6. In general, drive monitoring structures 24 are used to monitor the primary oscillation or drive mode and, like the drive device 23, can act on the coupling spring 4 between the rotationally suspended masses 1 or, and this is likewise not illustrated, can act on the masses 1 themselves or on the linearly oscillating frames 6. The rotation rate sensor illustrated in FIG. 8 also comprises additional actuator units, as comb structures 25 associated with the additional seismic masses 10 for the second read mode and, as electrodes 26, associated with the first and second seismic masses 1 for the first read mode. These additional actuator units make it possible to trim parasitic signals ("quadrature"), and/or to influence the frequency and/or to reset the deflections with respect to the read modes ("force feedback"). According to the example, read devices 15, 16, 17 and 18, which are in the form of electrodes, are arranged above seismic masses 1, and electrodes 26 are likewise arranged at the side as additional actuator units, above seismic masses 1, arranged such that they overlap them slightly, without touching.

The invention claimed is:

1. A micromechanical rotation rate sensor, comprising a substrate whose base surface is aligned parallel to the x-y plane of a Cartesian coordinate system (x, y, z), with the rotation rate sensor having at least one first and one second seismic mass which are coupled to at least one first drive device and are suspended such that the first and the second seismic masses are deflected in antiphase in one drive mode, with the rotation rate sensor being designed to detect rotation rates about at least two mutually essentially orthogonal sensitive axes (z, y), wherein
   at least the first and the second seismic masses oscillate in antiphase in a first read mode when a first rotation rate about the first sensitive axis (y) is detected, the first and second seismic masses and/or additional seismic masses oscillate in antiphase in a second read mode when a second rotation rate about the second sensitive axis (z) is detected, and the first and the second seismic masses oscillate in antiphase in a rotational drive mode,
   wherein the seismic masses are each associated with a phase read device and an anti-phase read device which are designed and arranged with respect to respective seismic masses to detect the deflections of the respective seismic masses with respect to the first and with respect to the second read mode in each case in phase and in antiphase.

2. The rotation rate sensor as claimed in claim 1, wherein the first and second seismic masses are coupled by at least one coupling spring, the coupling spring allowing deflection of the seismic masses only in antiphase, and in-phase, rotational deflection is suppressed, with the first and second seismic masses additionally being suspended on in each case at least one anchor such that linear deflections of the seismic masses in any direction (x, y, z) are essentially suppressed.

3. The rotation rate sensor as claimed in claim 1, wherein the rotation rate sensor has a single drive device which drives all the seismic masses of the rotation rate sensor, for which purpose the seismic masses are appropriately suspended and are directly or indirectly coupled to the single drive device.

4. The rotation rate sensor as claimed in claim 1, wherein the rotation rate sensor is designed and all of the seismic masses are arranged such that the center of gravity of the entire rotation rate sensor remains essentially at rest with respect to the deflections of the seismic masses in said one drive mode.

5. The rotation rate sensor as claimed in claim 1, wherein the rotation rate sensor is designed such that the first sensitive axis (y) lies on the x-y plane, and the second sensitive axis (z) is parallel to the z axis, that is to say at right angles to the base surface of the substrate.

6. The rotation rate sensor as claimed in claim 5, wherein the x-y plane is in the base surface of the substrate, and the first sensitive axis is parallel to the x axis or to the y axis.

7. The rotation rate sensor as claimed in claim 1, wherein all the seismic masses of the rotation rate sensor can move exclusively for their respective deflections within said one drive mode, for their respective deflections within the first read mode, with this relating only to the seismic masses which oscillate in the first read mode when a rotation rate about the first sensitive axis (y) is detected, and for their respective deflections within the second read mode, with this relating only to the seismic masses which oscillate in the second read mode when a rotation rate about the second sensitive axis (z) is detected, and the deflections take place in antiphase for the seismic masses which oscillate in the respective mode, with the seismic masses being suspended stiffly with respect to all other deflections.

8. The rotation rate sensor as claimed in claim 1, wherein the rotational drive mode is a rotational drive mode about the z axis.

9. The rotation rate sensor as claimed in claim 1, wherein the rotation rate sensor has four additional seismic masses, which are arranged and suspended symmetrically in a rest position with respect to the center of gravity of the entire rotation rate sensor.

10. The rotation rate sensor as claimed in claim 9, wherein the first and second seismic masses can exclusively carry out antiphase, rotational deflections about the z axis and about the x axis, and the additional seismic masses can exclusively carry out linear deflections in the direction of the x axis and in the direction of the y axis.

11. The rotation rate sensor as claimed in claim 9, wherein each of the additional seismic masses is at least partially suspended on a respectively associated frame, in each case in an inner area of the frame, which is in each case coupled to the first or to the second seismic mass, by which drive energy for the drive mode is transmitted from the first and the second seismic masses via a respectively coupling spring elements to the frames and to the additional seismic masses which are at least partially suspended thereon.

12. The rotation rate sensor as claimed in claim 11, wherein the frames can exclusively carry out linear deflections in the direction of the x axis.

13. The rotation rate sensor as claimed in claim 9, wherein one pair of the additional seismic masses is in each case coupled by a coupling beam such that one pair of the additional seismic masses can carry out only antiphase deflections with respect to the second read mode.

14. A micromechanical rotation rate sensor, comprising a substrate whose base surface is aligned parallel to the x-y plane of a Cartesian coordinate system (x, y, z), with the rotation rate sensor having at least one first and one second seismic mass which are coupled to at least one first drive device and are suspended such that the first and the second seismic masses are deflected in antiphase in one drive mode, with the rotation rate sensor being designed to detect rotation rates about at least two mutually essentially orthogonal sensitive axes (z, y), wherein
at least the first and the second seismic masses oscillate in antiphase in a first read mode when a first rotation rate about the first sensitive axis (y) is detected, and the first and second seismic masses and/or additional seismic masses oscillate in antiphase in a second read mode when a second rotation rate about the second sensitive axis (z) is detected,
wherein the seismic masses are each associated with a phase read device and an anti-phase read device which are designed and arranged with respect to respective seismic masses to detect the deflections of the respective seismic masses with respect to the first and with respect to the second read mode in each case in phase and in antiphase,
wherein the deflection of any of the seismic masses which oscillate in one of the read modes is detected in a duplicated and differential manner, with in each case two opposing deflections being detected with respect to the antiphase deflection for phase and for antiphase, and
wherein the seismic masses which oscillate in one of the read modes are associated overall with at least four read devices.

15. The use of a rotation rate sensor as claimed in claim 1 in motor vehicles, for detection of a yaw rate, and for detection of a roll rate or a pitch rate of the vehicle.

16. A micromechanical rotation rate sensor, comprising a substrate whose base surface is aligned parallel to the x-y plane of a Cartesian coordinate system (x, y, z), with the rotation rate sensor having at least one first and one second seismic mass which are coupled to at least one first drive device and are suspended such that the first and the second seismic masses are deflected in antiphase in one drive mode, with the rotation rate sensor being designed to detect rotation rates about at least two mutually essentially orthogonal sensitive axes (z, y),
wherein at least the first and the second seismic masses oscillate in antiphase in a first read mode when a first rotation rate about the first sensitive axis (y) is detected, and the first and second seismic masses and/or additional seismic masses oscillate in antiphase in a second read mode when a second rotation rate about the second sensitive axis (z) is detected,
wherein the seismic masses are each associated with read devices which are designed and arranged with respect to the seismic masses such that the read devices detect the deflections of the seismic masses with respect to the first and with respect to the second read mode in each case in phase and in antiphase, and
wherein the first and the second seismic masses oscillate in antiphase in a rotational drive mode.

* * * * *